Patented Jan. 8, 1929.

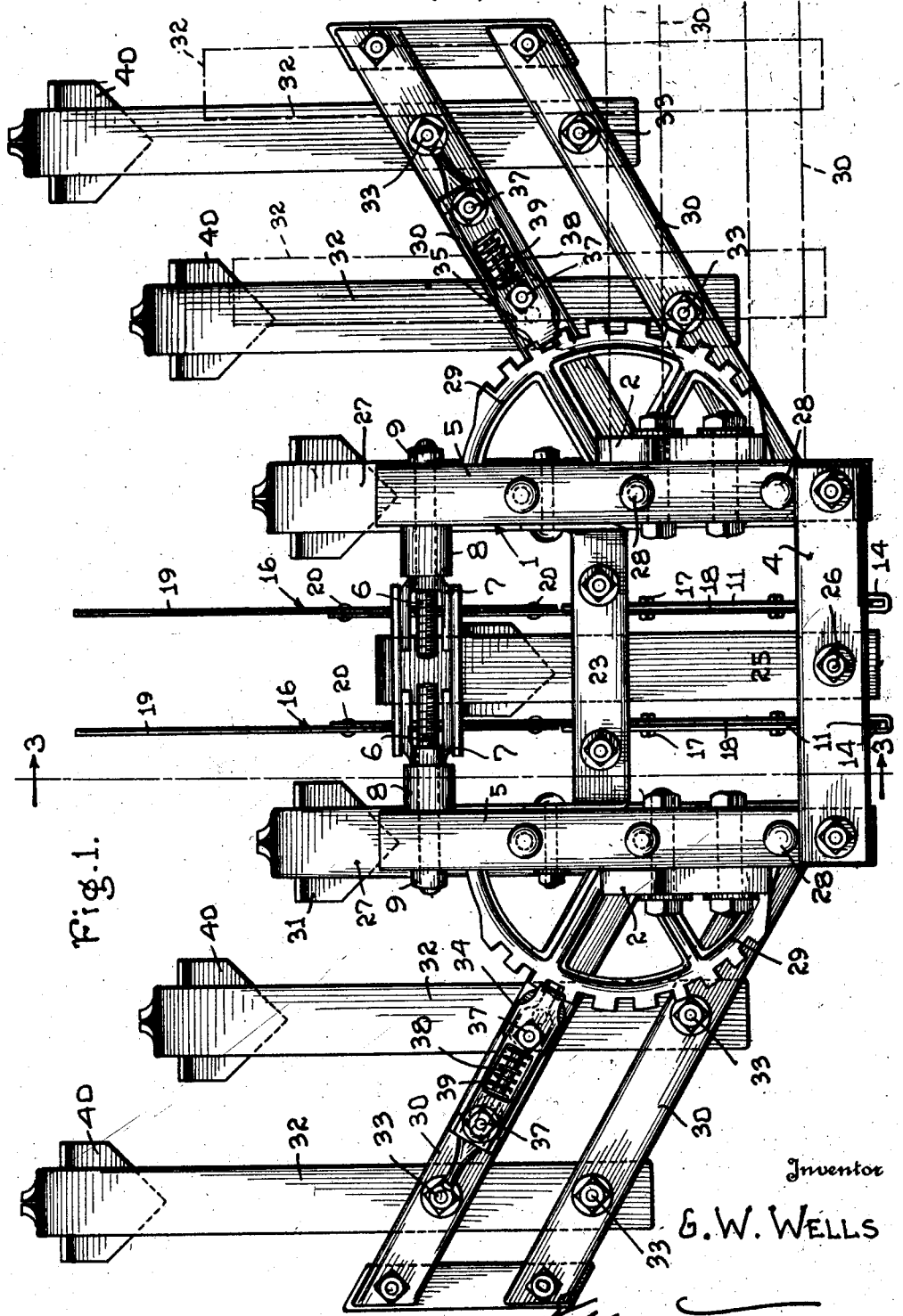

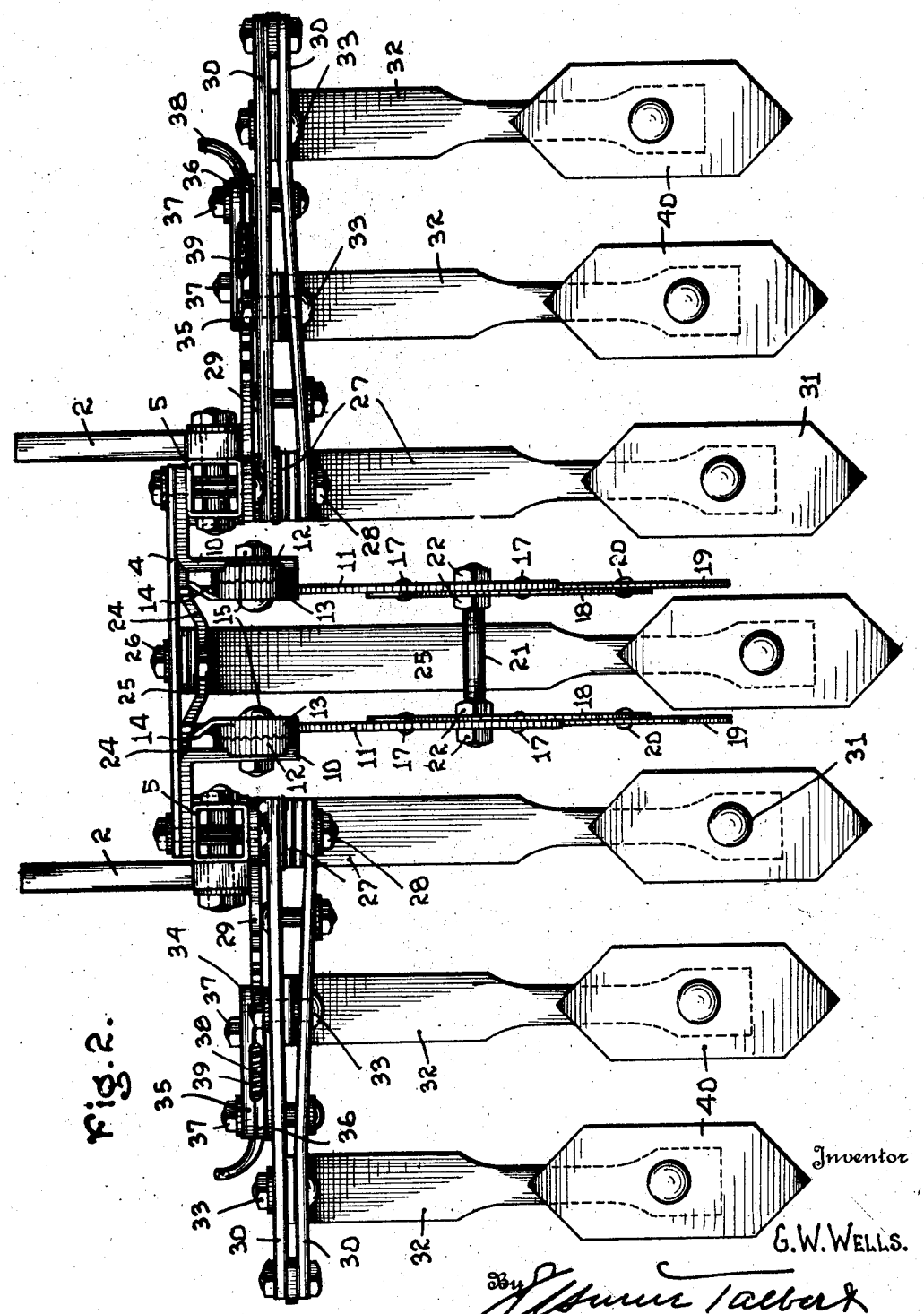

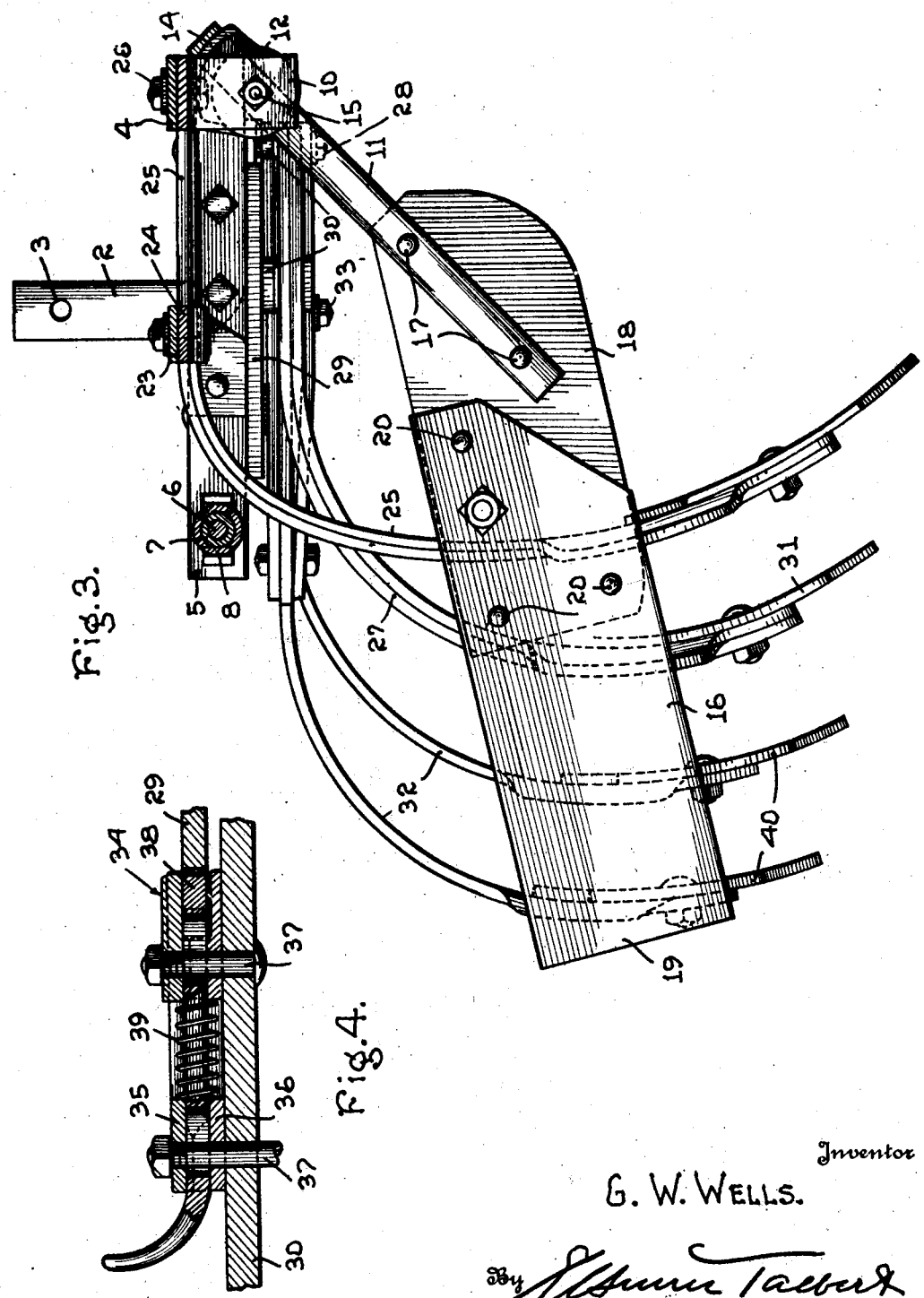

1,698,286

UNITED STATES PATENT OFFICE.

GEORGE W. WELLS, OF HAVANA, ARKANSAS.

CULTIVATOR ATTACHMENT.

Application filed May 16, 1925. Serial No. 30,767.

It is a purpose of the present invention to provide, in an implement for use in connection with a cultivator or the like, a construction for working the soil either prior to planting corn or cotton or a relatively short while thereafter, preferably the former, to insure a good growth of such products.

Another purpose is to provide an implement for such attachment comprising a frame with centrally supported spaced soil slicers or knives and soil working shovels, in conjunction with additional soil working shovels laterally on the sides of the first shovels for additionally working the soil, especially a distance spaced from the soil slicers or knives.

Still another purpose is the provision of adjustable supporting means for carrying said additional soil working shovels, whereby the latter may be adjusted with respect to the first shovels and the slicers or knives to insure a much better working of the soil.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a plan view of the improved implement or attachment for cotton or corn cultivators constructed in accordance with the invention.

Figure 2 is a front elevational view of the implement.

Figure 3 is a sectional view on line 3—3 of Figure 1.

Figure 4 is a detail sectional view through a spring detent for holding the additional soil working shovels in different positions.

Referring to the drawings, 1 designates a central rectangular frame which is the main support of the various soil working shovels and slicers or blades, and this support, by means of the uprights 2 having the apertures 3, may be operatively connected in any suitable manner (not shown) to a cotton or corn cultivator, it being understood that such attachment is to be made so as to permit the frame to be adjusted and in being adjusted or lifted, the soil working shovels or members are correspondingly raised.

The frame 1 forwardly thereof includes a transverse bar 4, the side members of the frame being in the form of tubing cross sectionally rectangular, the rear of the side members 5 of the frame being connected by bolts 6 which pass through forked members 7 and through sleeves or collars 8 and through the side members 5 and are provided with terminal nuts 9. In this manner, the frame is of rigid construction, especially adapted for the proper support of the centrally located slicers or blades and the soil working shovels.

Depending from the forward transverse bar 4 and secured between it and the forward ends of the side members or tubing 5 are angle members 10 from which bars 11 are suspended by means of the interengaging clamping disks 12 and 13. Figure 2 discloses the fact that the adjacent faces of the disks 12 and 13 are toothed so as to hold the disks in different positions. The bars 11 are carried by the disks 13, that is, they pass through slots of said disks 13 and through the loops 14. Suitable bolts 15 pass through the disks and through the bars 11.

The bars have attached to their lower portions soil slicers or blades 16. These slicers or blades extend rearwardly and downwardly at right angles to the main supporting frame and are adapted to drag over the soil for the purpose of slicing the clods and the like to assist in assuring a thorough working of the soil. The bars 11 are attached to such slicers or blades, as at 17. Each slicer or blade consists of two sections, a forward section 18 which is attached at 17 to the bars 11, and a rear section 19, the latter being fastened to the former, as at 20.

The rear sections are detachable from the forward sections, so that when the rear sections are worn or need repair or new ones to be attached, the connections 20 may be removed, allowing the repairs to be made. The slicers or blades are relatively spaced and are held in such positions by means of a transverse brace bolt or rod 21 of which its nuts 22 are on opposite sides of the blades or slicers to insure their relative positions. It is possible to regulate the nuts and space the slicers or blades accordingly.

The frame 1 has a transverse central brace bar 23 to which, by means of an underlying strap 24, a shovel carrying spring shank 25 is connected. The forward end of this shank is secured by means of a bolt 26 to the forward transverse brace bar 4. The lower end of the spring shank 25 carries a soil working shovel. Shovel carrying curved spring shanks 27 are secured by bolts 28 to the side members or tubing 5. These bolts 28 also pass through the segment racks 29 to hold them rigid relative to the central rectangular frame 1 and also through the bars 30 which are disposed underneath the segment racks. The bars 30 are in sets, each comprising two in number.

The curved spring shanks 27 carry at their lower ends soil working shovels 31 which are disposed adjacent the remote faces of the slicers or blades. The segment racks are provded for the purpose of retaining the bars 30 in different positions when the same are adjusted, as shown in dotted lines in Figure 1.

Curved spring shanks 32 are fastened by bolts 33 between the bars 30. These fastenings of the curved spring shanks 32 are sufficient to hold the shanks connected, so that the bars 30 can move pivotally when it is desired to adjust them, it being the aim not to tighten the bolts to an extent that would hold said bars 30 rigid, as their rigidity in position relative to the frame 1 is assured by means of spring detents 34 and as detailed in Figure 4. As the curved spring shanks 32 are pivoted between the bars 30, the bars 30 are likewise pivoted on the bolts 28, allowing the bars 30 to pivot when their adjustments are necessary to position the shanks 32 a greater distance from the shanks 27.

The detents 34 are in the form of upper and lower skeleton plates 35 and 36 which are secured to the bars 30 by means of the bolts 37. Between each pair of plates 35 and 36, the detent member proper 38 is interposed, there being a spring 39 on each detent. The construction and arrangement of the spring are such as to hold the detent 38 in engagement with any one of the notches of a segment rack 29. This will insure the retention of the bars 30 in their adjusted positions, as indicated in dotted lines in Figure 1, and thereby insure the adjusted positions of the curved spring shanks 32 which likewise support and carry soil working shovels 40 at their lower extremities. By releasing the detents, the shanks 32 with their soil working shovels may be adjusted so as to support the shovels a greater distance from the intermediate shovels.

In the operation, the implement being supported in any suitable manner upon the frame of a cotton or corn cultivator, is adapted to engage with the soil, prior or subsequently to planting, preferably the former, so that the shovels may work the soil. It is the aim to maintain the implement adjusted on the cultivator so that the soil may be worked downwardly a relatively short distance from its upper surface, the knives or slicers acting to slice or otherwise break the clods and insure a desired pulverizing of the soil.

The invention having been set forth, what is claimed is:

1. An implement for the purpose indicated comprising a frame, a centrally disposed soil working shovel depending from the frame at the transverse center of the latter, spaced parallel slicers or blades suspended from the frame and disposed one on each side of the shovel, a plurality of soil working shovels arranged in two gangs of which one gang is disposed laterally of each of the slicers, and uprights secured to the frame on opposite sides thereof and provided with terminal apertures for connections to elements of a cultivator, so that the implement may be drawn by the former and yet have a pivotal connection with the same to permit the implement to be raised bodily.

2. An implement for the purpose indicated comprising a frame, soil working elements carried by the frame and below the latter, gangs of soil working elements disposed laterally of the frame, the frame consisting of tubular parallel side bars, a transverse bar spanning the side bars at the forward end, a transverse central brace bar connecting the side bars at intermediate points in their length, bolts passing laterally through the side bars at the rear ends, and a member engaging both bolts and rotatable to apply a tension to the two and thereby apply a compressive stress to the central brace bar and a tensile stress to the forward transverse brace bar.

In testimony whereof he affixes his signature.

GEORGE W. WELLS.